United States Patent
Dempski

(10) Patent No.: US 9,406,033 B2
(45) Date of Patent: Aug. 2, 2016

(54) TOLL HISTORY RECORDING METHOD AND DEVICE

(75) Inventor: David Raymond Dempski, Washington, NJ (US)

(73) Assignee: Cellco Partnership, Basking Ridge, NJ (US)

(*) Notice: Subject to any disclaimer, the term of this patent is extended or adjusted under 35 U.S.C. 154(b) by 564 days.

(21) Appl. No.: 13/285,792

(22) Filed: Oct. 31, 2011

(65) Prior Publication Data

US 2013/0110685 A1    May 2, 2013

(51) Int. Cl.
*G06Q 10/04*  (2012.01)
*G06Q 30/04*  (2012.01)
*G06Q 50/30*  (2012.01)

(52) U.S. Cl.
CPC .............. *G06Q 10/047* (2013.01); *G06Q 30/04* (2013.01); *G06Q 50/30* (2013.01)

(58) Field of Classification Search
CPC ....... G06Q 10/047; G06Q 30/04; G06Q 50/30
See application file for complete search history.

(56) References Cited

U.S. PATENT DOCUMENTS

| | | | |
|---|---|---|---|
| 6,826,473 B1* | 11/2004 | Burch | G01C 21/20 342/357.46 |
| 2004/0212518 A1* | 10/2004 | Tajima et al. | 340/928 |
| 2005/0222756 A1* | 10/2005 | Davis | G01C 21/3484 701/466 |
| 2007/0250258 A1* | 10/2007 | Hager | 701/201 |
| 2008/0234924 A1* | 9/2008 | Katou | 701/200 |
| 2011/0112717 A1* | 5/2011 | Resner | 701/33 |

FOREIGN PATENT DOCUMENTS

| | | |
|---|---|---|
| JP | 2004-236125 | 8/2004 |
| JP | 2004-240479 | 8/2004 |
| JP | 2010-175372 | 8/2010 |
| JP | 2011-070581 | 4/2011 |

* cited by examiner

*Primary Examiner* — H Rojas

(57) ABSTRACT

A portable device, which is unrelated to an ETC system, includes a processor, a GPS receiver, a memory, a wireless interface enabling wireless access to an outside server. The memory stores a program which, when executed by the processor, causes the device to obtain map information and toll gate information by accessing the outside server, periodically obtain a location of the device by using the GPS receiver and record the location in the memory so as to create location history data in the memory. The program also enables the device to determine whether or not the device passes a toll gate based on the location, the map information and the toll gate information and to record a toll amount of the toll gate according to the toll information in the location history data in the memory.

12 Claims, 5 Drawing Sheets

TOLL HISTORY RECORDING METHOD AND DEVICE

BACKGROUND

An electronic toll collection system (ETC) has been widely used to automatically collect tolls at a toll gate. Ezpass® is one such an electronic toll collection system. The ETC generally requires a vehicle side device (e.g., "a tag") located on a vehicle. When a vehicle in which the vehicle side device is installed passes through an ETC toll gate, an antenna located in the ETC toll gate electrically reads account information of the vehicle side device, and the toll is electrically deducted from an account associated with the vehicle side device. A history of payments can be obtained from a website of an ETC operator.

However, the area covered by one ETC system is often limited, and only a vehicle in which a vehicle side device is installed may be able to use the ETC toll gate. For example, when a person is on a business trip and uses a rental car, the person has to pay the toll in cash (or by a credit card) every time the car reaches a toll gate. Further, the person has to record the toll amount or to retain receipts of the toll for reimbursement purposes. In some case, the person has to record the name of the toll gate and/or date and time when the car passes the toll gate. Moreover, access to ETC systems in determining the toll amounts may be a painstaking manual process or may not be allowed (e.g., for security reasons) if attempts are made using automated methods.

Accordingly, there is a need for providing a method, an apparatus or a system that enables a user to track toll amounts and travel distance by utilizing a portable device, such as a wireless phone, and that is independent from ETC systems or devices.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

At a high-level, the technologies in the following examples enable a user who travels by vehicle to automatically record a toll payment history or create a toll payment history so that the user can easily create a reimbursement report. In some examples, the portable device 10 (and thus the toll tracking program) may be independent of ETC systems and devices. In other words, the portable device 10 does not have the same functionality as an ETC device. In these examples, both the information obtained by the portable device 10 as a result of operating the toll tracking program (e.g., map and toll gate information) and the information created and sent by the portable device 10 as a result of operating the toll tracking program may be independent of (i.e., not include) any information resulting from operations of the ETC systems and devices (even if the information from both sources may overlap).

Figure 1A:
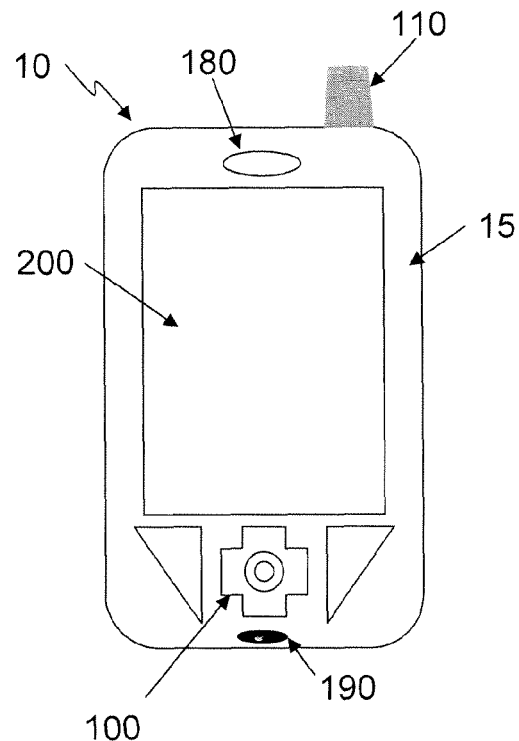
FIG. 1A shows an exemplary front view of a portable device for mobile communications and for recording a toll history.

FIG. 1A illustrates a front view of an exemplary portable device. The portable device 10, for example, may be a wireless device such as a touch screen type wireless phone, a personal digital assistance (PDA) or a portable navigation device. Of course, the techniques described here may be applicable to other types of devices such as a PC, an on-board navigation devices or a telematics unit, which in some examples are equipped with a GPS receiver or other mechanism that enables location to be obtained. The portable device 10 may include a main body 15, input keys 100, antenna 110, a speaker 180, a microphone 190 and a touch panel display 200. The configuration of the portable device elements is not limited to the arrangement shown in FIG. 1A. While in some examples the portable device 10 may not be equipped with any ETC device, in other examples a toll tracking program in the portable device 10 may provide supplemental information to that provided by the ETC device, e.g., to more easily enable reimbursement expense reports to be created.

Figure 1B:
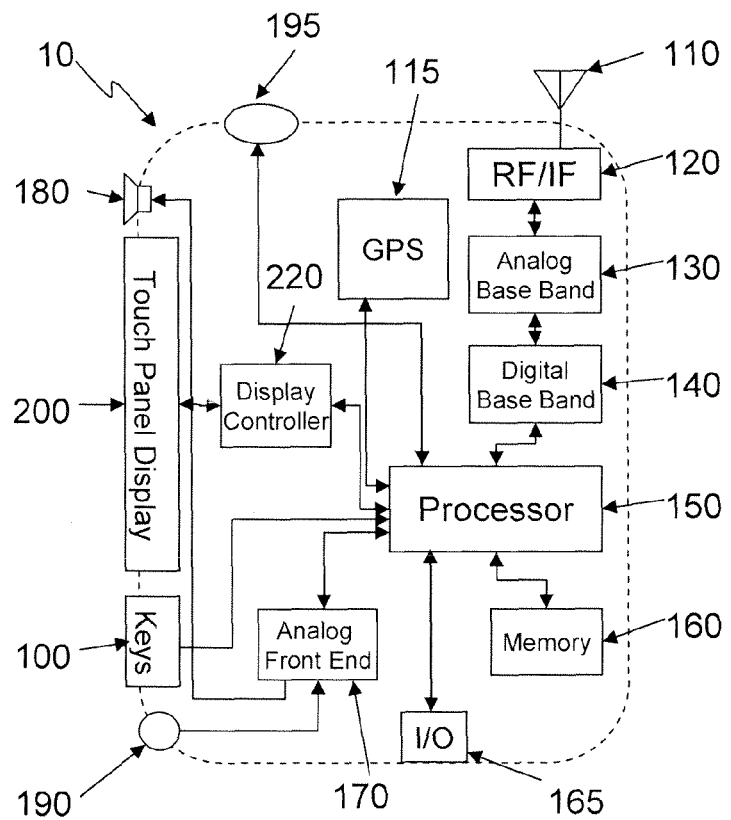
FIG. 1B shows an exemplary block diagram of the portable device of FIG. 1A.

FIG. 1B shows an exemplary block diagram of elements of the portable device 10 of FIG. 1A. The portable device 10 may include an RF interface 120 connected to the antenna 110, an analog base band processor 130 and a digital base band processor 140 connected to a processor 150. The processor 150 may be a single processor or include multiple processors. A display controller or driver 120 is connected to the touch panel display 200 and the processor 150 for controlling the touch panel display 200. An analog front end processor 170 is connected to the processor 150 for controlling the speaker 180 and the microphone 190. The processor 150 in configured to control the display controller 220, RF circuits (120, 130 and 140), the analog front end processor, and an I/O circuit 165. The processor 150 also connects to memory 160 as a storage medium. The memory 160 may include, for example, a RAM, a ROM or a flash memory. The memory 160 may store any number of application programs. The portable device 10 further may include a GPS receiver 115.

The memory 160 may also store a toll tracking program which realizes a method for tracking toll amount as disclosed herein. In the example, the memory 160 is coupled to the processor 150 to allow the processor to access programs and data in the memory 160, e.g., to access the toll tracking program for execution. The toll tracking program may be implemented by a ROM embedded in a semiconductor device together with a processor. In the alternative, the processor 150 may be configured to cause the portable device to perform the method. Of course, a part of or an entire of the portable device may be so structured or configured by hardware to perform the method.

Figure 2:
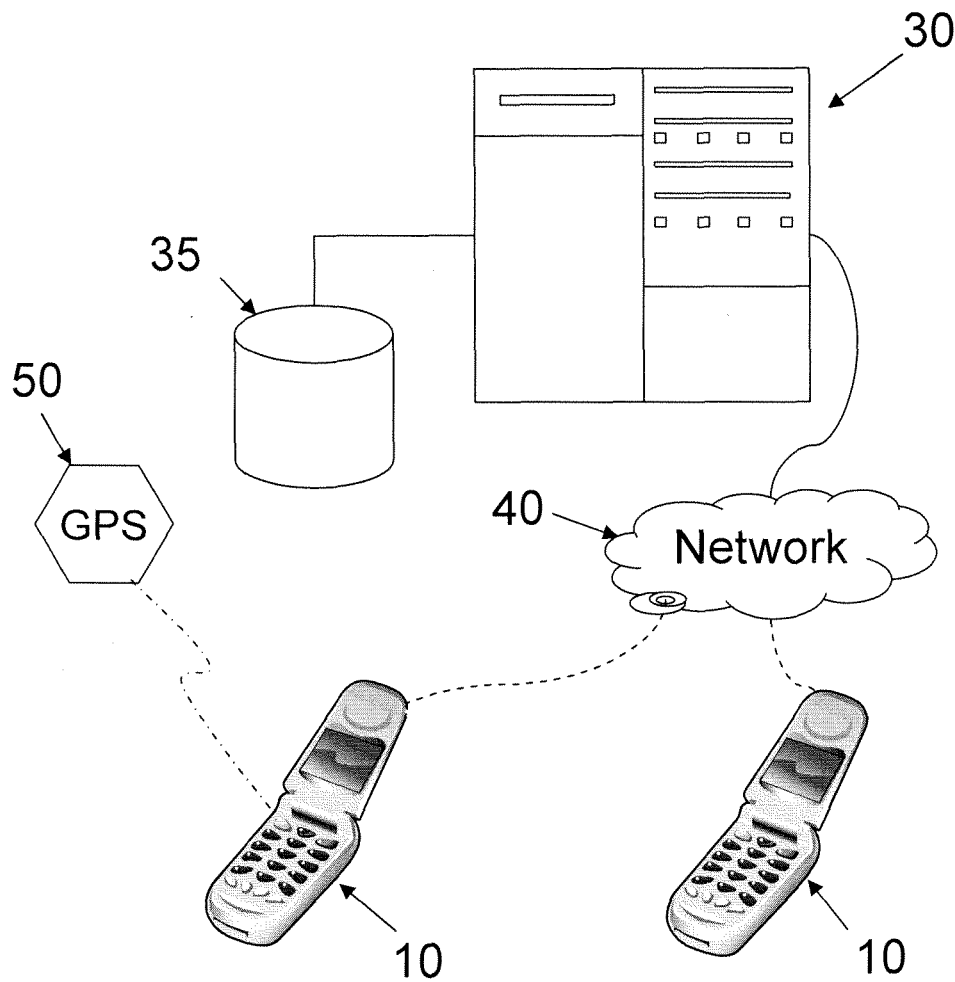
FIG. 2 shows an exemplary overall system for toll history recording.

FIG. 2 is an exemplary system diagram of server interaction with portable devices. A number of the portable devices 10 may be accessible to a server 30 through a network 40 including a wireless network. The server 30 includes a storage device 35 for storing toll database and one or more application programs. In some examples, the server 30 may not be a part of any ETC system.

Figure 3:
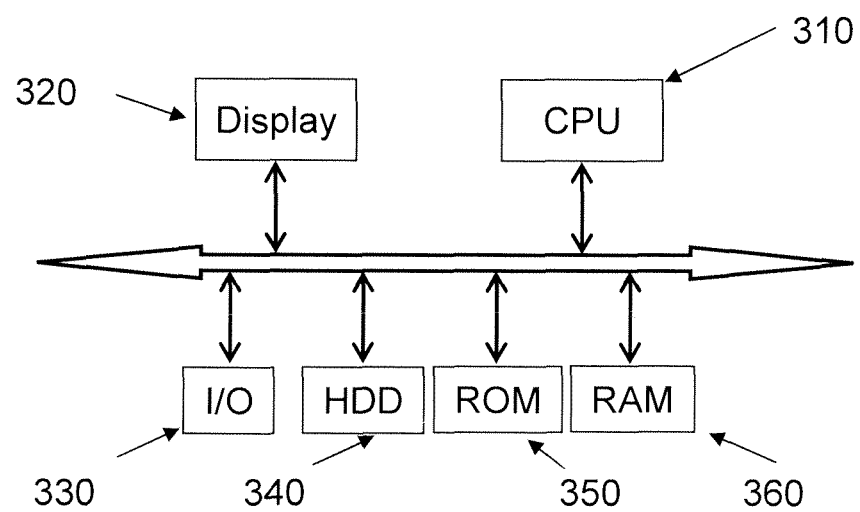
FIG. 3 shows an exemplary block diagram of a server as may be used in the system of FIG. 2.

FIG. 3 is a functional block diagram of an exemplary server 30 as one example of a computer system. As shown in FIG. 3, the server 30 may be a computer system including a central processing unit (CPU) 310 and a storage device 340, for example a hard disk drive (HDD). The CPU 310 may be a single processor or multiple processors. The HDD 340 may store application programs which run on the CPU 310 of the server. As shown in FIG. 3, the server 340 may also include a ROM 350, a RAM 360, an I/O port 330 or a display 320. The server 30 is connected to network 40. One of HDD 340, ROM 350 and RAM 360 includes a server program which, when executed by the CPU 310, causes the server 30 to perform the server-implemented functions disclosed herein. Of course, a part of or the entire of the server may be structured or configured by hardware so as to perform the functions. Also, those skilled in the art will appreciated that the functions attributed to the one server may be implemented across a number of physically separate hardware platforms connected to the network 40 in a distributed implementation.

The server 30 stores, among other information, map information including a road map and toll information of toll roads included in the road map.

A user who wishes to utilize the toll tracking method as disclosed herein first activates the toll tracking program on his/her portable device 10. The toll tracking program may be activated manually by the user or automatically using a predetermined trigger, e.g., when a predetermined location is reached or after leaving such a location. If the portable device 10 does not store a toll tracking program, the user can download a toll tracking program through the network 40 from the same or a different server as that storing the road map and toll information.

Figure 4:
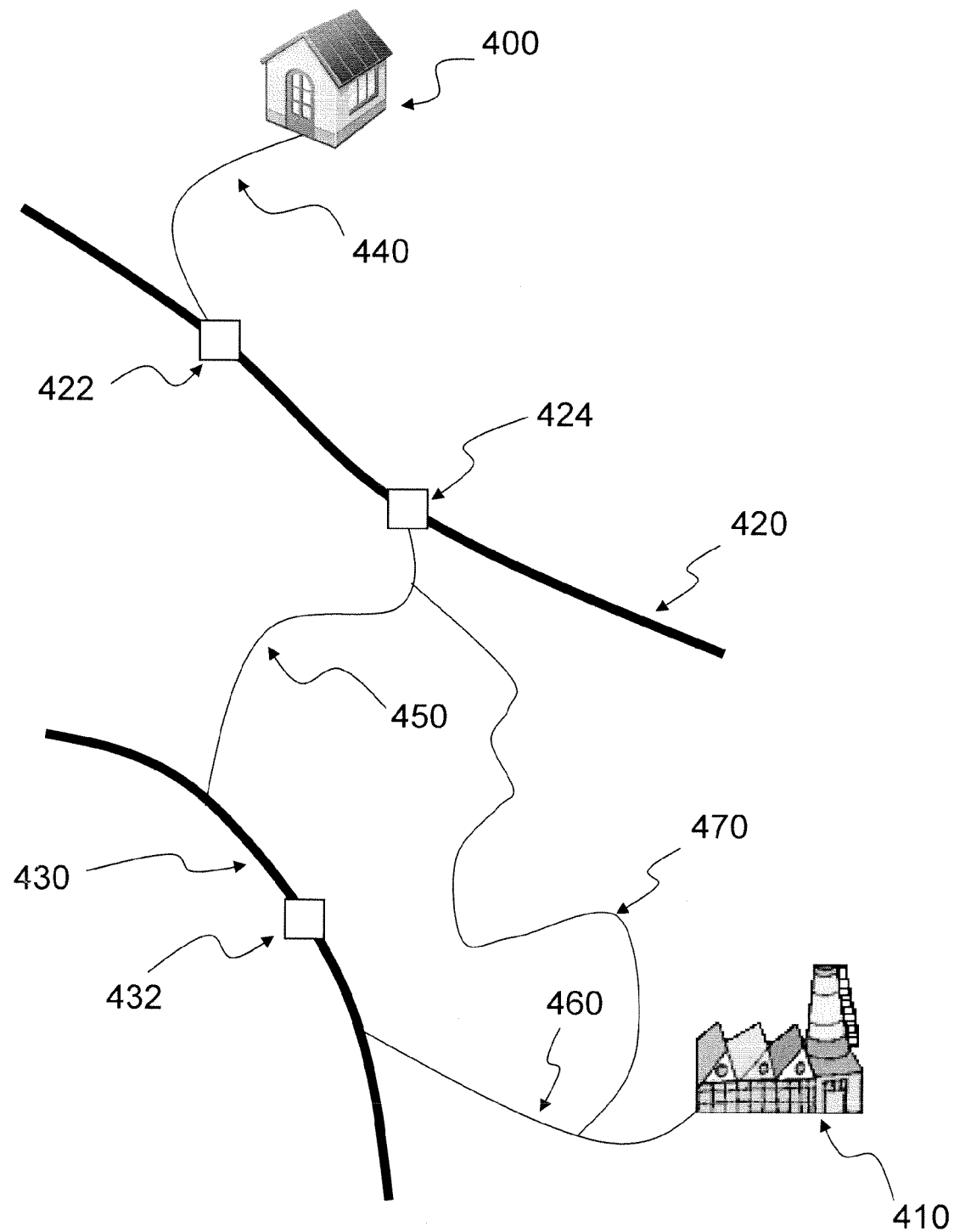
FIG. 4 shows an exemplary driving route.

For example, if the user is traveling on a business trip by car from his/her house 400 to a factory 410, as shown in FIG. 4. His/her car is not equipped with any ETC device (or the toll road in the area where the user will visit does not provide an ETC service compatible with the user's ETC device). Even if the portable device 10 is equipped with an ETC device and the user travels the toll roads covered by the ETC device, the user may still utilize this toll tracking program to create toll history data.

The user decides to use local roads 440, 450 and 460 and toll roads 420 and 430. In this example, the toll on the road 420 is based on distance traveled from an entrance to the road 420 to an exit from the road 420, as represented by gates 422 and 424. The toll on the road 430 is based on passage through one toll gate 432.

At a start point, for example, the user's home 400, the user activates the toll tracking program to start recording history of his drive. For example, once the toll tracking program is accessed on the portable device 10, the user may be verbally or visually prompted to initiate the toll tracking program, e.g., being prompted to press or tap a "start" button displayed on the display 200.

Once the toll tracking program starts after the user takes the appropriate action, the portable device 10 obtains the position of the portable device 10 for example, periodically such as every 1-5 seconds, by using the GPS system in the portable device 10. Note that in the examples below, as the portable device 10 is in the car, the location of the portable device 10 may be also referred to as the location of the car. As known, the GPS receiver 115 receives signals from GPS satellites 50, and the portable device 10 (the receiver 115 and/or the processor 150) determines the position (latitude and longitude) of the portable device 10 (i.e., GPS receiver 115). The obtained position may be recorded in the memory 160 of the portable device 10. If the portable device 10 is a wireless phone, it is also possible to obtain the position of the portable device 10 by obtaining from a serving base station. In this case, however, the accuracy of the position may be lower than that provided by the GPS receiver.

If the portable device 10 does not include a GPS receiver (or for some reason the GPS receiver in the portable device 10 is not used), the portable device 10 may still receive the position of the vehicle from another device equipped with a GPS receiver. For example, when a navigation system equipped with a GPS receiver is installed in the vehicle, the portable device 10 may receive the position information (i.e., GPS data) from such a navigation system via a wired connection or a wireless connection. The wireless connection may be implemented by Bluetooth®.

The portable device 10 also obtains map information by accessing the server 30 through the network 40. The toll information of the map information includes information of toll gates, e.g., locations and payment types of toll gates. The payment types may include a fixed fee payment toll gate at which a predetermined amount that does not depend on the distance traveled on the toll road is charged or a distance-based payment toll gate at which the toll is charged based on the distance traveled on the toll road. The map information may be stored in the portable device 10.

On the way from the home 400 to the first toll gate 422 (as shown, an entrance) of the toll road 420, the portable device 10 records driving history including positions of the portable device 10 (i.e., positions of the car). During or after the travel, distance(s) can be calculated from the recorded positions, e.g., to determine total distance traveled in the business trip, distance(s) of any segment of the travel and/or distance traveled on a toll road. When the car comes close to the toll gate 422 and passes the toll gate 422, the portable device 10 determines whether the portable device 10 (and thus car in which the portable device 10 is disposed) has passed through the toll gate 422.

Figure 5:
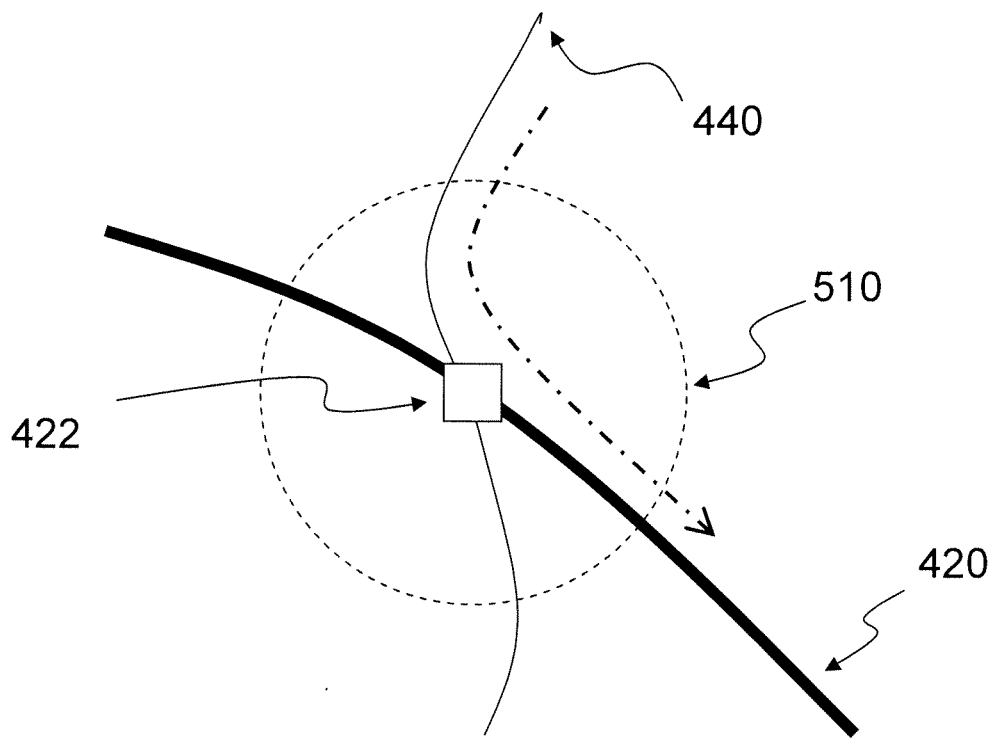
FIG. 5 shows one example of determining whether a car has passed a toll gate into a toll road.

For example, the portable device 10 may determine that the car has passed the gate 422 as follows. The portable device 10 determines whether the history of positions of the portable device 10 shows that the position of the car is within a predetermined area 510 from the location of the toll gate 422, and if so, after the car exits the predetermined area 510, whether the car is on the toll road 420 (see, FIG. 5). If the portable device 10 determines that the car is on the toll road 420 after passing through the predetermined area 510, the portable device 10 determines that the car has passed through the toll gate 422. The predetermined area 510 can be, as shown in FIG. 5 for example, a circle from the toll gate 422 and the diameter of the circle can be determined based on the accuracy of the GPS system and complexity of an intersection around the toll gate 422. For example, the diameter can be 50-200 m. Known navigation technologies such as map matching may be employed to determine whether the car has passed through a toll gate.

Figure 6:
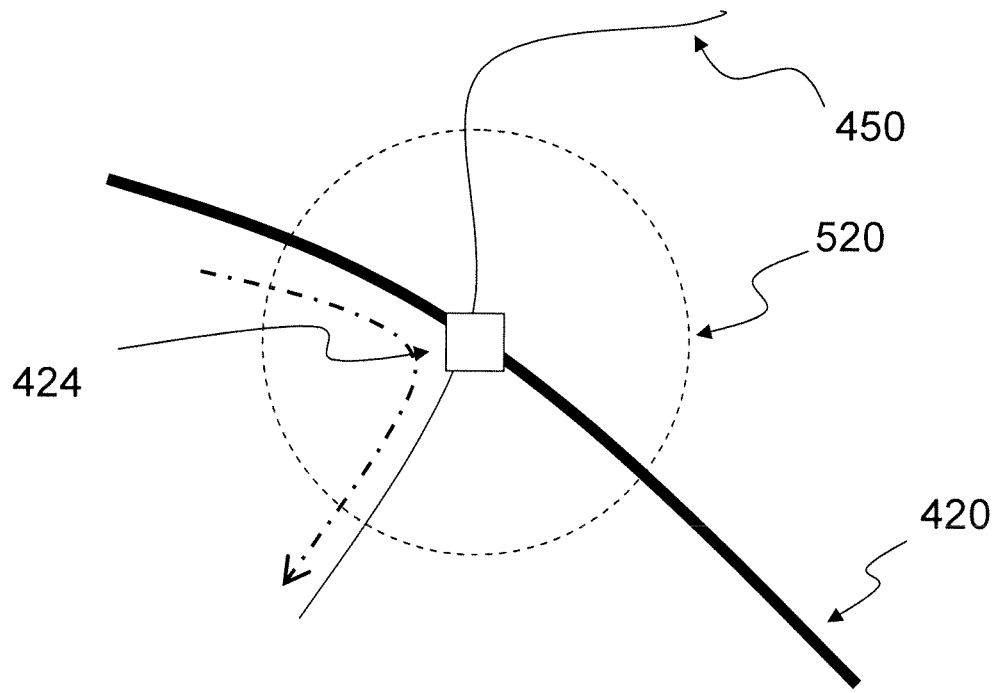
FIG. 6 shows one example of determining whether a car has passed a toll gate into a local road.

After driving on the toll road 420, the user passes the second toll gate 424 (as shown, an exit) and gets off the toll road 420, and drives onto local road 450. The portable device 10 determines whether the car has passed through the toll gate 424 in a manner similar to the above. Similar to FIG. 5, as shown in FIG. 6, the portable device 10 determines whether the history of positions of the portable device shows that the position of the car is on the toll road 420 and within a predetermined area 520 from the location of the toll gate 424, and whether, after the car exits the predetermined area 520, the car is not on the toll road 420. If the portable device 10 determines that the car is not on the toll road after passing the predetermined area 520, the portable device 10 determines that the car has passed through the toll gate 424.

When the portable device 10 decides that the car has passed through the toll gate 424 and exits the toll road 420, the portable device 10 obtains a toll amount between the gates 422 and 424. The portable device 10 can obtain the toll amount from the map information if the map information includes a toll amount corresponding to the zone between the gates 422 and 424. In some cases, the portable device 10 can access the server 30 to obtain the toll amount corresponding to the zone between the gates 422 and 424. The obtained toll amount, a name of the toll gate and a date and time when the portable device passed through the toll gate may be recorded in the memory 160, for example, as a part of the driving history.

As shown in FIG. 4, the local road 450 merges onto the toll road 430. The toll road 430 includes a toll zone and a toll collection gate 432 is located on the toll road 430. In a manner similar to the above, the portable device determines whether the car has passed through the toll gate 432. For example, when the driving history shows that the car was on the toll road 430, entered the predetermined area near the toll gate 432 (e.g., a circle area), exited the predetermined area and then was still on the toll road 430, the portable device 10 determines that the car has passed the through toll gate 432. In this case, based on the information of the toll gates, the portable device 10 knows that the toll gate is a fixed fee payment toll gate. Known navigation technologies may be employed to determine whether the car has passed a toll gate.

When the portable device 10 decides that the car has passed through the toll gate 432, the portable device 10 obtains a toll amount for the use of the toll zone of the toll road 430. The portable device 10 can obtain the toll amount from the map information if the map information includes toll amount corresponding to the toll gate 432. In some cases, the portable device 10 can access the server 30 to obtain the toll amount corresponding to the toll gate 432. The obtained toll amount may be recorded in the memory 160, for example, as a part of the driving history.

When the user arrives at the factory 410, the user may stop the toll tracking program. If the user has provided the factory 410 as a destination at the beginning of the trip, the portable device 10 may automatically stop the toll tracking program when the portable device 10 detects that the portable device 10 is at the factory location. Of course, the user may stop the toll tracking program at any other point, e.g., when the user returns to his/her home 400 to record the entire business trip history. When the user stops the toll tracking program, the memory 160 stores a set of driving history data that includes the history of toll amounts as well as driving distance, which can be obtained from the driving history. To obtain the driving distance, known navigation technologies can be utilized. Further, the portable device 10 may determine that the car has returned to the home 400 based on the positions of the portable device 10 and the history, and automatically stops the toll tracking program upon determining that the car returned.

Figure 7:
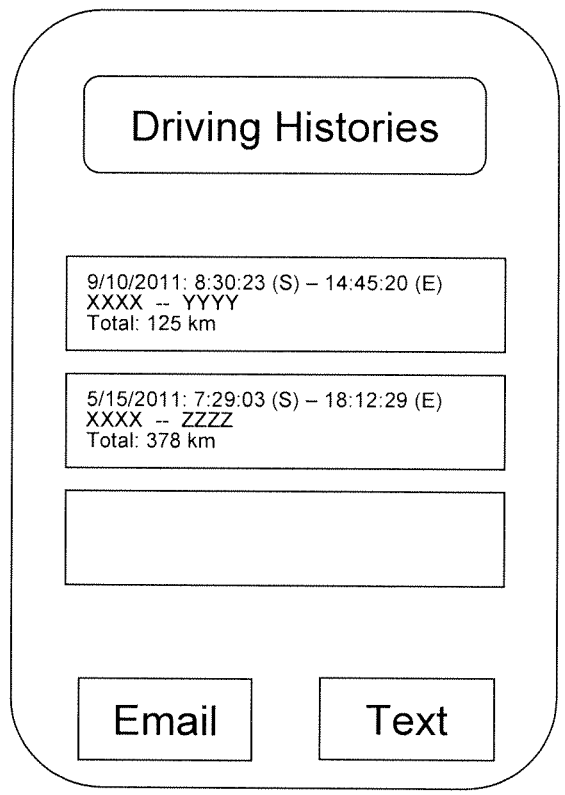
FIG. 7 shows an exemplary screen view of the portable device showing history lists.

After completing the business trip, the driving history may be transmitted from the portable device 10, for example, via email or as a text message. This transmission can be triggered when an event occurs, e.g., the transmission can be triggered manually by the user or automatically such as at a particular time and/or when a predetermined location is reached. As shown in FIG. 7, the portable device 10 displays a list of driving histories. One or more of the histories may be manually or automatically selected, and subsequently transmitted, e.g., as a business trip reimbursement report, to the user's business email address or a specific address designated by a company for which the user works, such as a manager's address, an address of an accounting department or a human resources department. In the example, the selected history can be sent via email or as a text message, although other data forms may be used. For example, a large amount of data may be compressed and sent, or related data in multimedia forms may be sent with the history. The driving histories may be manually deleted by the user or automatically deleted from the portable device 10, for example, at predetermined intervals (e.g., three months), after a predetermined amount of data has been stored, or after the history data is successfully sent to the server.

Figure 8:
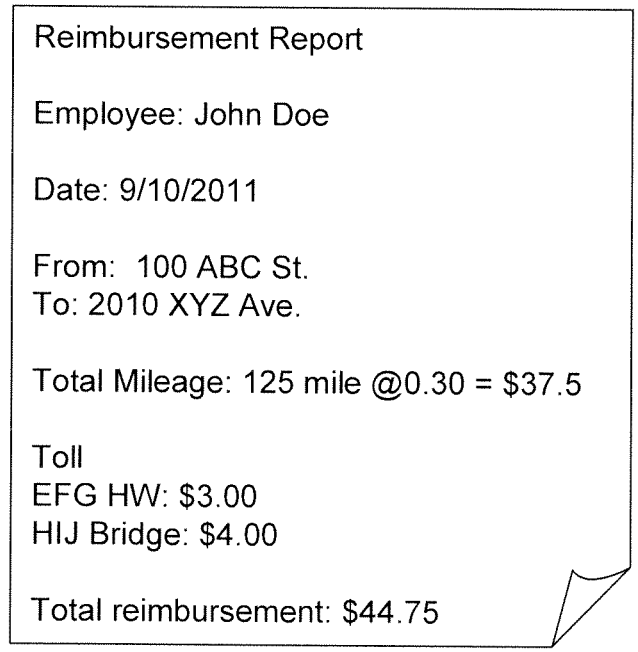
FIG. 8 shows an exemplary reimbursement report.

FIG. 8 shows an example of a trip reimbursement report. The business trip reimbursement report may include the total driving distance (mileage), toll information such as toll amount and toll gate name together with the user's personal information such as employee ID. If a mileage reimbursement rate is set in the toll tracking program, the toll tracking program can automatically calculate the reimbursement amount based on the rate and distance and display and/or transmit this additional information as a part of the driving history.

By using GPS-based driving history data, it is possible for an employer to correctly reimburse the business trip cost to the employee. For example, if the employee decides to use local roads (such as local road 470) instead of toll roads (such as toll road 430), a driving history may be automatically created in which the toll at toll gate 432 is avoided. This also permits adjustment of the mileage (if reimbursement/mile exists). It also reduces the possibility of an employee manually creating a fictitious reimbursement report stating that he/her used the toll road 430 and paid the toll at the gate 432.

In the above example, it is possible for the user to specify a type of his/her motor vehicle, for example, an automobile/car, a motor cycle, a truck or a trailer or a number of axles. Accordingly to the input type of the car, the toll tracking system can obtain a correct toll amount for that type of vehicle.

In the above example, the portable device 10 locally stores the toll amount and records the toll amount together with the toll gate information. However, in other examples the portable device 10 may only record the driving history (locations of the car) and when such driving history may be sent, e.g., to a server, the server can obtain toll amounts based on the driving history. The server may be the same as or a different server than the server 30. The amount of storage in the memory 160 used by the toll tracking program in this case may be reduced.

In this latter example, the toll tracking program may be initiated at the start point of a business trip (e.g., at home 400) and drives to the factory 410. On the way to the factory 410, the portable device records the driving history by utilizing the GPS receiver 115. When the user finishes driving, the toll tracking program may be terminated. Then, the driving history may be transmitted to the server 30. The server 30 stores map information and toll gate information. Based on the driving history, which includes location data, the server 30 can decide which toll gate the car has passed through and obtain toll amounts. Further, the server 30 can obtain total driving distance (mileage) from the driving history.

Then, the server 30 creates a reimbursement report based on the toll amounts and mileage. The created reimbursement report may be sent back to the portable device 10, and/or to his/her business email address or a specific address designated by a company for which the user works, such as a manager's address, an address of an accounting department or a human resources department. The reimbursement report can be sent via email or as a text message.

Thus, even if a user drives without an ETC device or on a toll road without an ETC system, the user does not need to manually record the toll payment history since a portable device is able to automatically record the toll gate information and the toll amount, whether some or all of this information is obtained from a server or stored in memory of the portable device. Further, creation of a reimbursement report may be simplified and fraudulent reimbursement requests may be reduced.

The aforementioned toll tracking program can be distributed by a non-transitive recording medium, for example, but not limited to, optical disks (such as a CD-ROM, a DVD-ROM or Blu-Ray ROM), EEPROMs (such as a flash memory) and magnetic disks (such as a floppy disk). Alternatively, the toll tracking program may be distributed through any wired or wireless network (e.g., cellular or WiFi). In that case, the toll tracking program may be stored in a server of the network and sent to a designated address when first downloaded or when being updated.

Although certain specific examples have been disclosed, it is noted that the present teachings may be embodied in other forms without departing from the spirit or essential characteristics thereof. For example, the text messages may include SMS messages, an Enhanced Messaging Service (EMS) message and a Multimedia Messaging Service (MMS) messages. The present examples described above are considered in all respects as illustrative and not restrictive. The patent scope is indicated by the appended claims, and all changes that come within the meaning and range of equivalency of the claims are therefore intended to be embraced therein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory storage medium on which a program is recorded, the program when executed by a processor included in a portable device having a memory and a transceiver enabling wireless access to an outside server, causes the portable device to perform functions, including functions to:
   obtain map information and toll gate information by accessing the outside server;
   periodically obtain a location of the portable device to provide multiple obtained locations of the portable device;
   automatically activate a toll tracking function when a most recent one of the obtained locations corresponds to a first predetermined location;
   upon the activation of the toll tracking function:
      periodically record the obtained locations in the memory so as to create location history data in the memory;
      determine whether or not the portable device passes a toll gate based on the location history data, the map information and the toll gate information; and
      upon determining that the portable device passed the toll gate:
         record, with the location history data in the memory, a to amount of the toll gate from the to gate information,
         calculate a reimbursement amount based on the recorded toll amount and the location history data;
   automatically stop the toll tracking function when another most recent one of the obtained locations corresponds to a second predetermined location;
   create a reimbursement report including the calculated reimbursement amount, a mileage reimbursement amount, and an identification of an employee in possession of the portable device passing the toll gate, and
   after the location history data is complete, automatically send the location history data to a computer system outside of the portable device via email or as a text message, responsive to the other most recent one of the obtained locations corresponding to the second predetermined locations corresponding to the second predetermined location,
wherein the portable device is independent from any electronic toll collection systems and devices for toll dates for a vehicle.

2. The non-transitory storage medium of claim 1, wherein: the portable device further includes a global positioning system (GPS) receiver, the location of the portable device is obtained by using the GPS receiver.

3. The non-transitory storage medium of claim 1, wherein the toll gate information includes a name of the toll gate, and date and time when the portable device passes through the toll gate are recorded in the location history data.

4. The non-transitory storage medium of claim 1, wherein the functions further include functions to send the reimbursement report to the computer system outside of the portable device via email or as a text message.

5. The non-transitory storage medium of claim 1, wherein the mileage reimbursement amount is calculated based on distance information included in the location history data.

6. The non-transitory storage medium of claim 1, wherein the functions further include functions to automatically delete the location history data at a predetermined time after automatically sending the location history data to the computer system.

7. A device, comprising:
a processor;
a wireless interface coupled to the processor enabling wireless access to an outside server;
a memory coupled to the processor; and
a program stored in the memory,
wherein the program, when executed by the processor, causes the device to perform functions, including functions to:
obtain map information and toll gate information by accessing the outside server;
periodically obtain a location of the device to provide multiple obtained locations of the portable device;
automatically activate a toll tracking function when a most recent one of the obtained locations corresponds to a first predetermined location;
upon the activation of the toll tracking function:
periodically record the obtained locations in the memory so as to create location history data in the memory;
determine whether or not the device passes a to gate based on the location history data, the map information and the toll gate information; and
upon determining that the device passed the toll gate:
record with the location history data in the memory; a toll amount of the toll gate from the toll gate information,
calculate a reimbursement amount based on the recorded toll amount and the location history data;
automatically stop the toll tracking function when another most recent one of the obtained locations corresponds to a second predetermined location;
create a reimbursement report including the calculated reimbursement amount, a mileage reimbursement amount, and an identification of an employee in possession of the device passing the toll gate,
after the location history data is complete, automatically send the location history data to a computer system outside of the portable device via email or as a text message, responsive to the other most recent one of the obtained locations corresponding to the second predetermined location, and
wherein the device is independent from any electronic toll collection systems or devices for toil gates for a vehicle.

8. The device of claim 7, further comprising a global positioning system (GPS) receiver coupled to the processor, wherein the location of the device is obtained by using the GPS receiver.

9. The device of claim 7, wherein the toll gate information includes a name of the toll gate, and date and time when the device passes through the toll gate are recorded in the location history data.

10. The device of claim 7, wherein the functions further include functions to send the reimbursement report to the computer system outside of the device via email or as a text message.

11. The device of claim 7, wherein the mileage reimbursement amount is calculated based on distance information included in the location history data.

12. The device of claim 7, wherein the functions further include functions to automatically delete the location history data at a predetermined time after automatically sending the location history data to the computer system.

* * * * *